Nov. 9, 1937.   G. E. NERNEY   2,098,512
EYEGLASS CONSTRUCTION
Filed Aug. 1, 1933
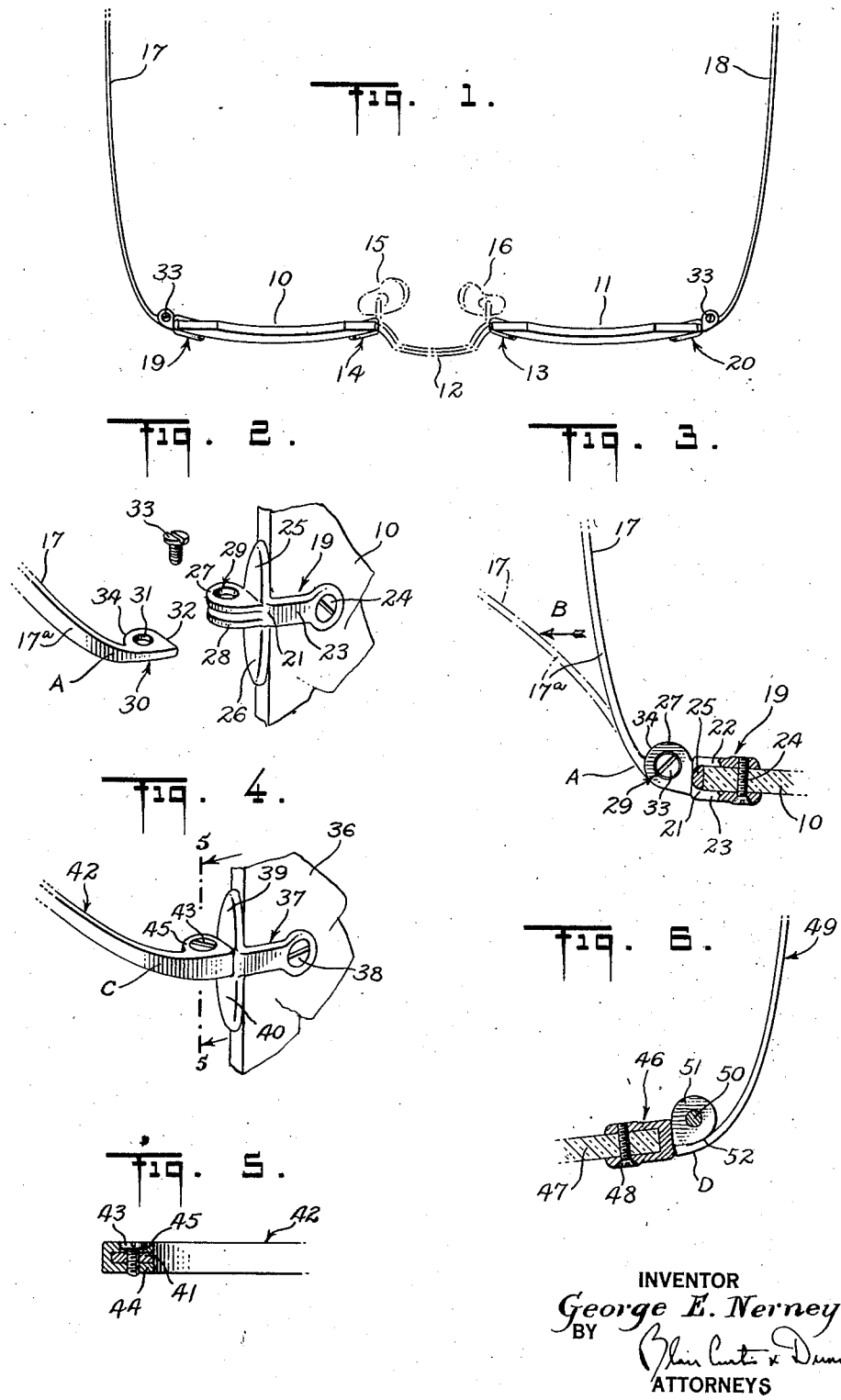
INVENTOR
George E. Nerney
BY
ATTORNEYS Patented Nov. 9, 1937

2,098,512

UNITED STATES PATENT OFFICE 2,098,512

EYEGLASS CONSTRUCTION

George E. Nerney, Attleboro, Mass., assignor to Bay State Optical Company, Attleboro, Mass., a corporation of Maine Application August 1, 1933, Serial No. 683,135

4 Claims. (Cl. 88—53)

This invention relates to an eyeglass construction and, more particularly, to the temple and lens connecting parts of an eyegass frame.

One of the objects of this invention is to provide an eyeglass construction which will be simple, practical, and thoroughly durable. Another object is to provide a construction of the above character which will be pleasing in appearance and capable of hard use in practice. Another object is to provide a construction of the above character which will result in a saving of labor and materials in the manufacture thereof. Another object is to provide a construction particularly applicable to frames of the "rimless" type and which, when so applied, reduces the hazard of lens breakage. Another object is to provide a construction of the above character which, without sacrificing the ultimate beauty of the frame, increases the strength and possible life of an otherwise fragile frame, an example of which is a "rimless" frame. Another object is to provide a construction of the above character in which the temples will be particularly strong and well suited to hard use. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing, in which is shown several of the various possible embodiments of my invention, Figure 1 is a top plan view of an eyeglass frame having the preferred embodiment of my invention applied thereto;

Figure 2 is an exploded perspective view of portions of the frame shown in Figure 1;

Figure 3 is a horizontal sectional view, on an enlarged scale, of a portion of the frame shown in Figure 1;

Figure 4 is a perspective view in side elevation of another embodiment of my invention as applied to a lens;

Figure 5 is a vertical sectional view taken along the line 5—5 of Figure 4, and

Figure 6 is a top plan view, on an enlarged scale, of a further embodiment of my invention.

Similar reference characters refer to similar parts throughout the several views of the drawing.

As conducive to a clearer understanding of certain features of this invention, it might here be pointed out that eyeglass frames are inherently of a fragile character and this is more particularly true of the lenses of the "rimless" type of frame. Such lenses are constantly subject to breakage which is not only an inconvenience but an undue expense to the wearer thereof. One of the most vulnerable points on lenses of the "rimless" type is the portion thereof adjacent the connection between the endpiece or lens saddle secured to the endpiece and the lens. In spectacles or frames having temples pivotally connected to endpieces where some form of stop is employed to prevent the temple from moving beyond a position at right angles to the plane of the lens, further movement of the temple against this stop creates a leverage between the temple and the straps extending over the opposite surfaces of the lens which often causes a break in the lens. Often when the wearer is unfolding the temples preparatory to putting the frame on, he spreads the temples to exert this damaging leverage action hereinabove referred to. This damaging leverage action is further accentuated by the fact that many modern temples are constructed so that they have a greater vertical than lateral dimension, i. e., the dimension perpendicular to the pivotal plane of the temple is the greatest. Accordingly, temples of this character resist any force tending to bend them in a vertical direction. Such vertical forces are, therefore, deviated and added to the normal bending forces in the pivotal planes of the lenses. The result is an increased force on the pivotal plane which, by the leverage action above-described, is often sufficient to break or seriously damage the lens. One of the objects of this invention is to provide a construction in which the several difficulties hereinabove referred to as well as many others are successfully and practically overcome.

Referring now to Figure 1, there is shown an eyeglass frame having a pair of lenses 10 and 11 connected by a bridge 12 secured to the lenses by suitable saddles generally indicated at 13 and 14. Preferably, I secure nose guards 15 and 16 to the opposite depending portions of bridge 12.

A pair of temples 17 and 18 are preferably connected to saddles generally indicated at 19 and 20 respectively, these saddles and temples being substantially similar in construction. Accordingly, temple 17 and its connected parts will be described in detail, this description sufficing for temple 18 and saddle 20.

As more clearly shown in Figures 2 and 3, saddle 19 comprises a central portion 21 in engagement with the edge of lens 10 and a pair of arms 22 and 23 extending over the opposite surfaces thereof. Preferably, I provide a screw 24 extending through arm 23, lens 10, and threaded into arm 22. Accordingly, saddle 19 is securely fastened to lens 10 and is further provided with a pair of extensions 25 and 26 preferably engaging the edge of lens 10 to prevent pivoting of saddle 19 about screw 24 as an axis.

Extending from saddle 19 are a pair of lugs 27 and 28 suitably spaced from each other and preferably integral with the saddle. Suitable registering holes generally indicated at 29 are provided in lugs 27 and 28. Thus, a plane passing through the space between lugs 27 and 28 is substantially at right angles to the plane of lens 10.

The end generally indicated at 30 of temple 17 is flattened into the form shown most clearly in Figures 2 and 3, thus having a hole 31 and a flat abutting wall 32 substantially parallel with the body portion 17a of the temple. Accordingly, end 30 of temple 17 fits between lugs 27 and 28 and is pivotally secured in this position by a screw 33 preferably extending through lug 27 and end 30 and threaded into lug 28. When in this position, wall 32 engages central portion 21 of saddle 19 to stop pivotal movement of temple 17 after it reaches a position substantially at right angles to the plane of lens 10. However, end 30 is so rounded on its side 34, as viewed in Figure 3, that it is free to pivot in a right-hand direction as viewed in this figure so that the body portion of the temple may be brought into a position substantially parallel to the plane of lens 10.

It will now become clear that the abutting wall 32 of temple 17 is of substantial length so that any spreading force exerted on the temple 17 is distributed over a substantial area of the end 30 of the temple, and I have discovered that this increases the durability and strength thereof so that the possibility of bending the temple out of line is reduced to a minimum.

As best shown in Figure 3, body portion 17a of temple 17 extends away laterally from the end thereof. Temple 17 (see Figure 2) has its flat side substantially parallel to the edge of lens 10, that is to say, its vertical dimension, as viewed in this figure, is much greater than its horizontal dimension. Accordingly, temple 17 is free to bend in lateral directions in the plane of its pivot but cannot bend appreciably in a vertical direction as viewed in Figure 2. Thus the spring point of temple 17 is very close to lugs 27 and 28 or approximately in the vicinity of the portion indicated at A. By the term "spring point" I mean that portion of temple 17 from which the body 17a of the temple bends in the plane of its pivot when a force is exerted thereagainst, and further pivotal movement in a counter-clockwise direction, as viewed in Figure 3, is prohibited by abutting wall 32.

Accordingly, it will now become clear that by this unique construction I have located the spring point A of temple 17 very close to screw 24 which holds the saddle to the lens. I have discovered that when a force is exerted against the temple in a direction indicated by the arrow B, this force being concentrated in either direction about the temple's pivotal plane after the temple has reached its extended position, a leverage force is exerted on the lens substantially at that portion thereof adjacent screw 24. Furthermore, this leverage force is proportional to the distance between spring point A and screw 24. Thus, a reduction of this distance materially diminishes the leverage force exerted by temple 17 and consequently acts as a material safeguard against lens breakage by way of such action. As pointed out above, one of the most common ways in which lenses are broken is by the tendency of the wearer to spread the temples when placing them in proper position. Accordingly, by providing a practical means to remedy this common deficiency, the strength and ultimate durability of the entire frame is increased.

Turning now to Figure 4, there is shown a lens 36 having secured thereto a saddle generally indicated at 37 and substantially similar in construction to saddle 19 (Figure 1). Thus, saddle 37 is secured to lens 36 preferably by way of a screw 38 extending through the lens and connected to suitable arms forming a part of the saddle. Also, saddle 37 has a pair of oppositely depending portions 39 and 40 in substantial engagement with the edge of lens 36. Extending from saddle 37 is a lug 41, the plane of which is substantially at right angles to the plane of lens 36.

Pivotally secured to lug 41 is a temple generally indicated at 42. Temple 42 is preferably secured to lug 41 by way of a screw 43 extending through spaced lug portions 44 and 45 formed on the end of temple 42. Accordingly, as best shown in Figure 5, the end portion of temple 42 embraces three sides of lug 41 for the body portion of the temple extends about a portion of the periphery of the lug to abut against saddle 37. The end portion of temple 42 (Figure 4) is substantially similar in cross-section to the end portion 30 (Figure 2) of temple 17. Thus, the curved body portion of the temple as well as lugs 45 and 44 are formed into flat walls which abut against saddle 37 when temple 42 reaches a position substantially perpendicular to the plane of lens 36. Furthermore, the spring point C of temple 42, which is also of greater vertical than lateral dimension as viewed in Figure 4, is substantially adjacent lug portions 45 and 44 thereof. Hence, spring point C in the pivotal plane of temple 42 is very close to screw 38. Furthermore, due to the tendency of temple 42 to resist any vertical bending, the full effect of a bending force is concentrated in the pivotal plane of the temple. Nevertheless, due to the close proximity of the spring point C to the screw 38, the damaging leverage force which might be exerted thereby is materially reduced and breakage avoided.

It will now become clear that in this embodiment of my invention I have provided a pair of abutting walls on temple 42 capable of withstanding hard practical use without material injury. Furthermore, spring point C on temple 42 is moved close to screw 38 thereby reducing the leverage of the spreading force B hereinabove described with reference to Figure 3. Thus, many of the advantages mentioned above with regard to the preferred embodiment of my invention are found in this embodiment of my invention. The two abutting walls form a further provision against temple damage.

Referring now to Figure 6, there is shown a further embodiment of my invention in which a saddle generally indicated at 46, substantially similar in construction to saddle 19 (Figure 1), is secured to a lens 47 by way of a screw 48. A pair of lugs (not shown) extend from saddle 46 in a manner substantially similar to lugs 27 and 28 (Figure 2). Thus, a temple generally indicated at 49 is pivotally connected to saddle 46 preferably by way of a screw 50 extending through the end portion 51 of the temple and through the two supporting lugs. The general shape and construction of temple 49 is substantially similar to temple 17 (Figure 2) thus having a body portion greater in vertical dimension than horizontal as viewed in this figure. Temple 49 is provided with a slot 52 located between the body portion of temple 49 and the end 51 thereof. Slot 52 serves to bring the spring point D of temple 49 closer to screw 48, thus further reducing the leverage created by a spreading force as applied to temple 49 and as hereinabove described. Many of the advantageous features of durability found in the embodiments of my invention hereinabove described are retained in this embodiment with the further advantage of moving the spring point even closer to the lens retaining screw.

It will thus be seen that I have provided a thoroughly practical and efficient construction in which the several objects hereinabove referred to as well as many others are successfully accomplished.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In eyeglass construction, in combination, a lens, lens retaining means secured to said lens including a flat portion following and adjacent to the edge of said lens, said flat portion being wider than the edge of said lens, a lug extending from said flat portion in a substantially horizontal direction, a part fitting over said lug, a member pivotally connecting said lug and said part, and a temple bow curving inwardly toward the edge of said lens and connected to the outer side of said part, said part including a flat vertical inner surface substantially equal in extent to said flat portion, said flat surface running in a direction to be in substantially complete engagement with said flat portion when said temple is in its unfolded position to limit the unfolding movement of said temple.

2. In eyeglass construction, in combination, a lens, lens retaining means secured to said lens including a flat portion following and adjacent the edge of said lens, a lug extending from said flat portion in a substantially horizontal direction, a temple having a bow portion the greater portion of whose length extends in a substantially straight line and the forward end of which curves inwardly away therefrom to terminate in a flat lug, the major portion of said flat lug being spaced to the rear of the forward extremity of said bow portion and having a hole formed therein with a substantially vertical axis spaced to the rear of said forward extremity of said bow portion, said temple lug being in engagement with said first-mentioned lug, and a securing element extending through said hole and through said first-mentioned lug to form a pivotal connection therebetween whereby the spring point of said temple is moved close to the edge of said lens.

3. In eyeglass construction, in combination, a lens, lens retaining means secured to said lens including a flat portion following and adjacent the edge of said lens, a lug extending from said flat portion in a substantially horizontal direction, a temple having a bow portion the greater portion of whose length extends in a substantially straight line and the forward end of which curves inwardly away therefrom to terminate in a flat lug, the major portion of said flat lug being spaced to the rear of the forward extremity of said bow portion and having a hole formed therein with a substantially vertical axis spaced to the rear of said forward extremity of said bow portion, said temple lug being in engagement with said first-mentioned lug, said temple lug having a flat vertical inner surface of substantial length running in the general direction of said greater length of said bow portion, and a securing element extending through said hole and through said first-mentioned lug to form a pivotal connection therebetween so that said vertical surface of said second-mentioned lug engages said flat portion when said temple is in its extended position whereby the spring point of said temple is moved close to the edge of said lens.

4. In eyeglass construction, in combination, a lens, lens securing means including a saddle having a pair of wings extending over the opposite plane surfaces of said lens, and a flat portion adjacent the edge of said lens and of greater width than the edge of said lens, a lug extending from said flat portion in a substantially horizontal direction, a temple including a bow portion, the major portion of whose length is substantially straight and the forward portion of which curves inwardly to merge in a flat lug, the major portion of said flat lug being spaced to the rear of the forward extremity of said bow portion, said last-mentioned lug having a hole formed therein with a vertical axis spaced to the rear of said forward extremity of said bow portion, and a securing element extending through said lugs to form a pivotal connection therebetween, said second-mentioned lug having a flat inner surface shaped to engage the entire width of said flat portion when said temple is in its extended position whereby the spring point of said temple is moved close to the extremities of said wings.

GEORGE E. NERNEY.